United States Patent [19]

Conner

[11] 4,179,944
[45] Dec. 25, 1979

[54] FAIL SAFE REDUNDANT ACTUATOR

[75] Inventor: Gary E. Conner, San Jose, Calif.

[73] Assignee: United Technologies Corporation, Hartford, Conn.

[21] Appl. No.: 810,149

[22] Filed: Jun. 27, 1977

[51] Int. Cl.² .................... F16H 27/02; F16H 29/02; F16H 1/18

[52] U.S. Cl. .................. 74/89.15; 74/424.8 R; 192/141

[58] Field of Search ........ 74/89.15, 424.8 R, 424.8 A, 74/110, 89.15; 188/78, 343; 192/141, 143, 150; 92/31, 32, 33

[56] References Cited

U.S. PATENT DOCUMENTS

| | | | |
|---|---|---|---|
| 3,203,269 | 8/1965 | Perrine | 74/424.8 R |
| 3,209,090 | 9/1965 | Fry | 192/141 X |
| 3,221,118 | 11/1965 | Hoover | 192/141 X |
| 3,277,736 | 10/1966 | Goodman | 192/141 X |
| 3,302,473 | 2/1967 | Lowery et al. | 74/110 |
| 3,343,427 | 9/1967 | Silvestri | 74/428.8 R |
| 3,388,606 | 6/1968 | Hill et al. | 74/110 |
| 3,465,655 | 9/1969 | Rouderbush | 74/110 X |
| 3,479,890 | 11/1969 | Howell | 74/424.8 R |
| 3,512,421 | 7/1970 | Anderson | 74/424.8 R X |
| 3,535,944 | 10/1970 | Newstead | 74/110 |
| 3,630,328 | 12/1971 | Nelson | 192/8 R |
| 3,647,034 | 3/1970 | Weiger | 188/343 |
| 3,682,283 | 8/1972 | Sato | 192/141 |
| 3,763,747 | 6/1971 | Bichel et al. | 92/33 |
| 3,858,452 | 1/1975 | Gatland | 74/424.8 A |
| 3,989,223 | 11/1976 | Burkhardt et al. | 74/89.15 |

FOREIGN PATENT DOCUMENTS 48450 11/1937 France.

*Primary Examiner*—James T. McCall
*Attorney, Agent, or Firm*—Steven F. Stone

[57] ABSTRACT

An electromechanical actuator is provided which is capable of disconnecting the output shaft and the drive mechanisms in such a way that, in the event of either a rotational or translational failure during operation, the output shaft can be effectively freed in such a manner that it will not resist the motion produced by other actuators which have not failed.

2 Claims, 2 Drawing Figures

FAIL SAFE REDUNDANT ACTUATOR

BACKGROUND OF THE INVENTION

This invention relates to linear actuators and particularly to linear actuators which are employed in applications which require redundant actuating systems. The use in airplanes, space vehicles and propulsion systems and the like is exemplary. In such systems a linear actuator is used to drive a control such as a throttle linkage, a control surface such as a rudder or aileron or a movable nozzle assembly. In order to increase the reliability of such systems it is normal to employ redundant actuators such that in the event one actuator fails, control is not lost because a backup system is available. Position monitoring transducers and feedback networks are conventionally employed to monitor actuators, detect a failure and command the backup system to operate, as is known to the art. Even if a backup system is available, however, it is necessary to somehow disengage the failed actuator from the control to permit the operative actuator to function. For example, if the failure mode of the failed actuator was freezing of the output shaft in a particular position, the backup system could not operate the control until either the failed actuator was disengaged from the control or the actuator was "unfrozen". Although the prior art abounds in linear actuators of various types and configurations, no actuator exists in which a fail safe mechanism is provided to protect against either translational or rotational failure modes. Accordingly, it is an object of this invention to provide a fail safe electromechanical actuator.

These and other objects of the invention will be readily apparent from the following description with reference to the accompanying drawings wherein.

DESCRIPTION OF THE INVENTION

Figures 1, 3:
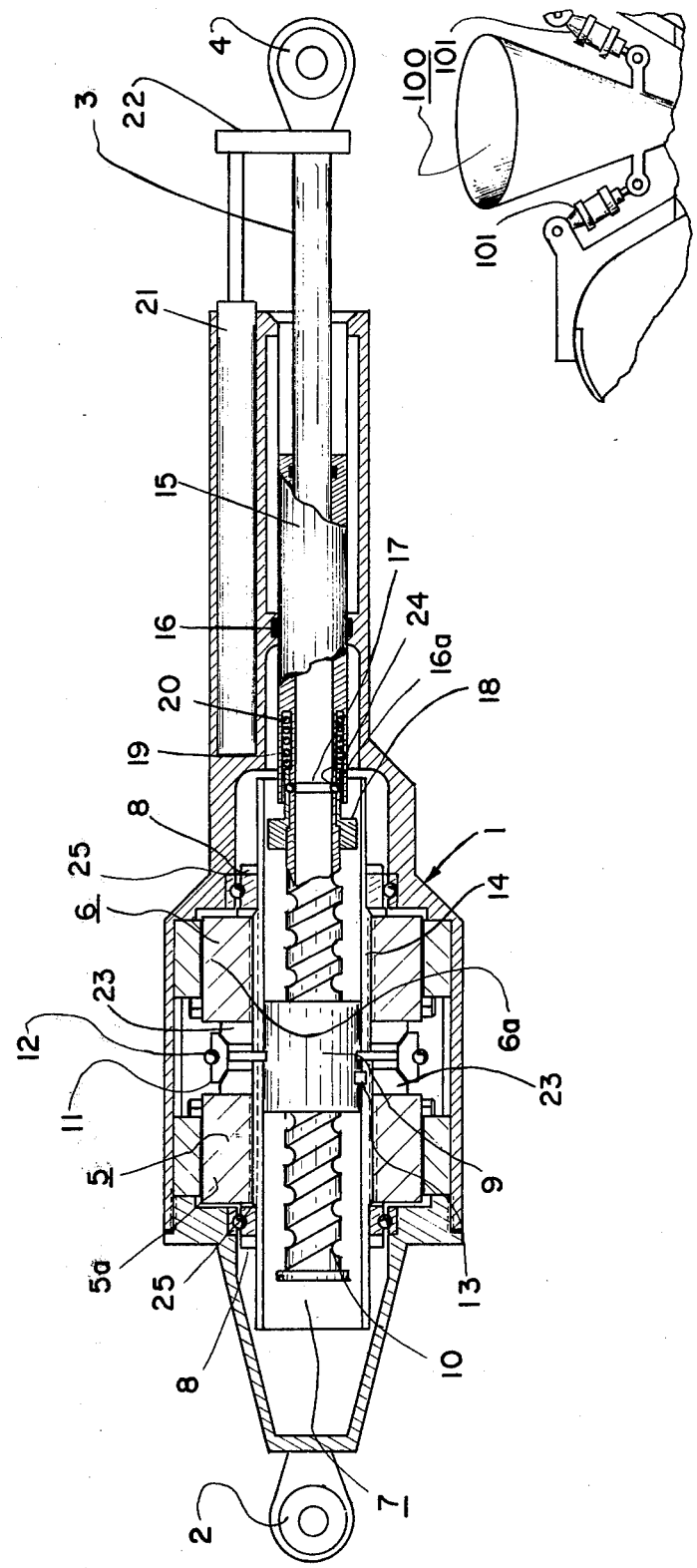
FIG. 1 is a cross-section view through one embodiment of actuator according to this invention.
FIG. 3 is a schematic representation of one use of the actuator of this invention.

Referring now to FIGS. 1 and 3, an actuator according to this invention consists of a housing 1 which may be provided at one end with mounting means 2 for connecting the housing to a structure. The actuation output of the actuator is taken off of output shaft 3 by suitable mounting means 4. The actuator is driven by two torque motors 5 and 6 which are contained within casing 1, the armatures 5a and 6a of which are threadably connected to rotor shaft 7 which is mounted for rotation within the housing on suitable bearings 8. It should be recognized that other reversible drive means such as turbine, fluid motors or other power sources can be used instead of electric motors but in most applications electric motors are most convenient and the invention will be described with respect to this embodiment. Motor 5 is the extend motor which is used to drive the output shaft in the extend direction and motor 6 is the retract motor which is used to retract the output shaft. Power is transmitted from the motors 5 and 6 to the output shaft by power screw means such as ball screws, roll screws, or threaded nut and screw and the like. In this embodiment the power screw means comprises ball nut 9 and ball screw 10. Ball nut 9 is maintained in releasable engagement with the rotor shaft 7 by one or more delatch pins 11 which are arranged around the periphery of rotor shaft 7 passing through holes provided therefor in shaft 7 and into a recess provided in ball nut 9. The head of delatch pins is provided with a wedge-shaped shoulder, the purpose of which will be apparent from the following description; they are biased in the latched position by means of garter spring 12. Ball nut 9 is also provided with a pin 13 which is engaged in a longitudinal slot 14 in rotor shaft 7 to permit longitudinal motion of the nut within shaft 7 while preventing relative rotation.

The ball screw 10 is connected with the guide shaft 15 which is free to translate within housing 1 on sleeve 16. Output shaft 3 is slidably received within the guide shaft 15 and is delatchably connected to guide shaft 15 by means of shaft delatch balls 16a which, in the latched position, are received within a groove 17 on output shaft 3 and engage holes formed in guide shaft 15. Shaft delatch slider 18 is slidably mounted around the output shaft 3 and received within an annular groove 19 containing bias spring 20 in the end of guide shaft 15. The output shaft 3 is connected with position transducers 21 which are received within housing 1 and move with output shaft 3 by yoke 22.

The operation of the device will be described with respect to a nozzle actuator for a movable nozzle rocket motor such as shown in FIG. 3 as 100. In such a system actuators 101 are normally provided in each of two mutually perpendicular axes required for complete control of the motor (the actuators in the plane perpendicular to the planes of the drawing have been omitted for clarity). In redundant systems two actuators would be used in each axis, one actuator being in the operative condition and the other being in the inoperative condition until its use is required as a result of failure of the operative actuator. In the operative position the actuator would have the condition shown in FIG. 1. Output shaft 3 would be caused to retract by appropriate electrical signals to retract motor 6 which would cause rotation of motor 6 in the counter-clockwise direction when viewed from the output end of the actuator. Rotation of motor 6 would cause rotation of rotor shaft 7 and ball nut 9, thereby causing ball screw 10 to withdraw output shaft 3 into the housing 1. Likewise, when it is necessary to cause output shaft 3 to extend, extend motor 5 would be driven in the clockwise direction causing clockwise rotation of rotor shaft 7 and ball nut 9 thereby driving output shaft 3 out of housing 1.

In the operation of the actuator two potential failure modes which must be fail-safed exist. One is a failure in the sliding portion of the actuator such as when guide shaft 15 would freeze against sleeve 16. The other failure is in the rotating portion of the actuator such as would occur if the ball nut or the rotor shaft were to freeze. If either of these failure modes were to occur the nozzle would be locked in position and would not be able to be moved by the remaining actuators unless the force applied by the remaining actuators was sufficiently great as to overcome the resistance in the failed actuator.

The motor armatures 5a and 6a are threaded onto rotorshaft 7 so that during normal operation each motor is at the end of its travel along rotor shaft 7 abutting suitable stop means such as pins 25. This arrangement keeps the armatures separated allowing garter spring 12 to retain the delatch pins 11 in the ball nut 9. The position of output shaft 3 in this type of system is normally continuously monitored by the position transducers 21 and in the event a signal is obtained indicative of a failed actuator, extend motor 5 and retract motor 6 would be commanded to reverse their directions of rotation. Thus motor 6 would be rotated clockwise and motor 5 would be rotated counter-clockwise, thereby driving armatures 5a and 6a together along the threaded portion of rotor shaft 7 to which they are mounted. As armatures 5a and 6a are driven together, shoulders 23 abut the head of delatch pins 11 driving the delatch pins outward against bias of garter spring 12. This can be accomplished by either motor 5 or 6 so that delatching occurs even if one motor has failed. When the delatch pins have been removed from ball nut 9, ball nut 9 becomes free to translate longitudinally within rotor shaft 7. However, rotation of ball nut 9 with respect to rotor shaft 7 is prevented by pin 13 and slot 14. At this point a rotational failure mode is fail-safed because if ball nut 9 were frozen to ball screw 10 or if rotor shaft 7 were frozen or if either motor was seized output shaft 3 is now released and free to slide.

If the failure mode however was in the sliding portion of the actuator, output shaft 3 would still be locked. Accordingly, after the ball nut delatch pins have freed the ball nut for translation with respect to rotor shaft 7 both motors are commanded to drive in the retract direction. This causes rotation of rotor shaft 7 and since ball nut 9 is still engaged with rotor shaft 7 by means of pin 13 and slot 14, ball nut 9 translates to the forward end of the ball screw 10 abutting shaft delatch slider 18 and forcing the same forward against the bias of spring 20. Shaft delatch slider 18 moves forward until the ball release groove 24 in the shaft delatch slider 18 aligns with the shaft delatch balls. Once this occurs any force on output shaft 3 will disengage the shaft delatch balls 16 and effectively free output shaft 3 from guide shaft 15. At this point in time the output shaft 3 is free to move and has been fail-safed against any one failure mode either rotational or translational.

At the same time that this sequence of events is occurring in the failed actuator, the backup actuator which is normally maintained in the fail-safe condition is given instructions to rotate motors 5 and 6 in the extend direction thereby moving ball nut 9 away from shoulder 18 towards the center of rotor shaft 7 and then both motors 5 and 6 are given signals causing them to operate in their proper direction forcing the motors against their stops and releasing ball nut latch pins to engage ball nut 9 upon the action of the garter spring 12. Similarly, upon release of the pressure on shaft delatch slider 18 the shaft delatch balls are once more engaged in the groove in output shaft 3 and the holes in guide shaft 15.

The embodiment of FIG. 1 utilized DC torque motors, the armatures of which were directly threaded onto the rotor shaft 7. Such an arrangement of the operative elements is not essential for the operation of a device within the scope of this invention. It is merely sufficient that the power from the extend and retract motors be transmitted to the rotor shaft through means which permit the actuation of the delatch mechanisms in the manner described. Thus, for example, referring to FIG. 2, another embodiment of the invention as shown which utilizes extend and retract motors 31 and 32 respectively which transmit their power to rotor shaft 33 by means of drive gears 34 and 35 which engage rotor gears 36 and 37 which are threadably mounted onto rotor shaft 33 and which have delatch pins 38 located there between and engaging the holes 52 in ball nut 45.

The output shaft 39 is normally coupled to guide shaft 40 by delatch balls 41 located in groove 42 in the output shaft and holes 43 in the guide shaft 40. The intermediate portion of the guide shaft 40 is formed with ball screw means 44 which engage ball nut 45. Position transducers 46 and 47 are affixed to the output shaft 39 by yoke 48 to provide for monitoring of the position of the output shaft. In the normal operation the retract motor 32 and the extend motor 31 would turn in the direction shown by the arrows forcing gears 36 and 37 against the stop pins 49 and 50 thereby causing appropriate rotation of the ball nut 45 and driving the output shaft in either the extend or retract direction as appropriate. In the event of a failure which prevents the movement of output shaft 39 a command would be sent to the respective motors 31 and 32 causing them to turn in the reverse direction from that shown, thereby driving gears 36 and 37 together along the threads on rotor shaft 33 forcing pins 38 outwardly against the bias of garter spring 51. As in the preceeding embodiment as the delatched pin 38 is removed from the groove 52 in the ball nut, the ball nut becomes free to translate within rotor shaft 33. At this point output shaft 39 is now free to translate in the event the failure was in a rotational element.

As in the previous embodiment, the ball nut is keyed to rotor shaft 33 to permit translation with shaft 33 while at the same time requiring the ball nut to rotate with shaft 33. In the event the failure is a translational failure, both motors are then driven in the shaft extend direction which has the effect of causing ball nut 45 to translate rearwardly into abutment with fail-safe sleeve 53 driving it backwards until the groove 54 in the sleeve aligns with the balls 41. When groove 54 is aligned with the balls 41 any force on output shaft 39 will be sufficient to disengage the output shaft 39 from the guide shaft 40 thereby freeing the actuator in the event of a translational bind on the output shaft and the actuator is now fail-safed for either a rotational or a translational failure.

While this operation is being carried out with the failed actuator, the redundant backup actuator which is normally in the inactive delatched condition would be given signals to cause both motors to turn in the retract direction which would cause the ball nut 45 to move forwardly causing the fail-safe sleeve 53 to be forced forwardly by the bias spring 55. When the ball nut has traversed to its normal operating position, the motors 31 and 32 would both be given signals to drive in the proper direction causing gears 36 and 37 to translate along the threaded portions of 33 to the outward position against the stops 49 and 50 thereby releasing pins 38 which, by the action of the bias of gartr spring 51, are forced into the retaining holes 52 in the ball nut, thereby rendering the redundant backup system operative.

The above described systems have the advantage that when used in pairs to position a load no single failure can cause loss of control, all fail-safe/relatch functions can be checked without disconnecting the load and each actuator is capable of positioning the load if the opposite actuator has failed.

An embodiment of FIG. 1 was designed to use rare earth DC torque motors having a stall input power level of 850 watts and stall force of 542 lbs. with a ball screw having a 0.5" lead. The total stroke was 4.20 inches with a no-laod speed of approximately 11 inches per second to produce an actuator force at 4.89" per second of 306 lbs.

Figure 2:
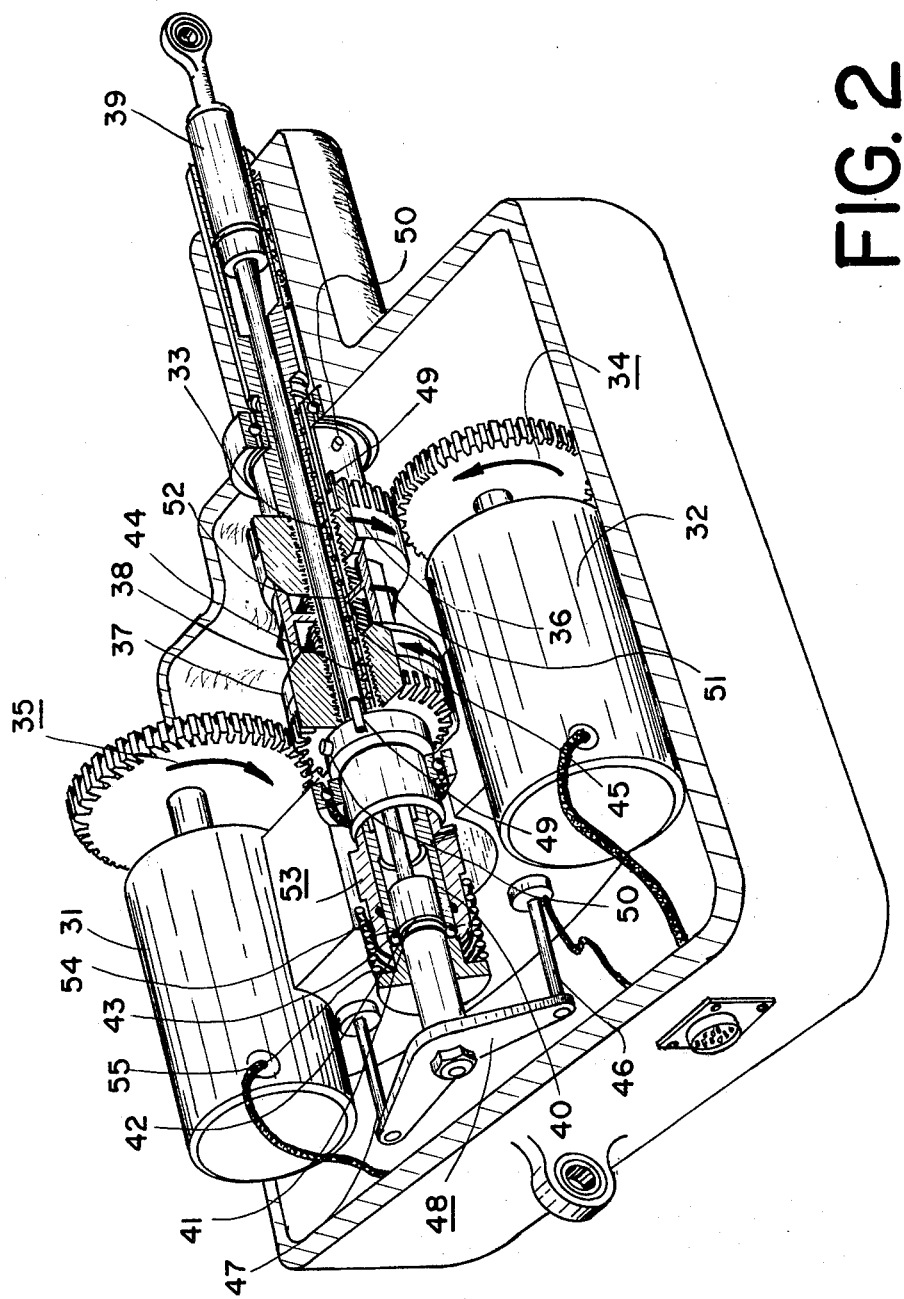
FIG. 2 is a cross-section, partly broken away, of another embodiment of the invention.

An embodiment according to FIG. 2 was constructed for use in a close coupled mode of submerged movable nozzle actuation which drew 10 amps at 28 volts at a frequency response of 2 Hz at 0.1 in. peak-to-peak amplitude, a total stroke of ±0.35 in. with a stall capacity of 1,000 lbs. The ball nut and screw had a 0.125 in. lead.

While the above invention has been described with respect to two specific embodiments thereof, it is quite apparent that the invention can be utilized in various forms and modifications of these embodiments can be made by workers skilled in the art without departing from the scope of this invention which is limited only by the following claims wherein:

I claim:

1. A fail-safe actuator comprising:
   (a) an output shaft;
   (b) a guide shaft receiving said output shaft;
   (c) first delatchable coupling means connecting said output shaft and said guide shaft;
   (d) power screw means for driving said guide shaft in a longitudinal direction, said power screw means comprising screw means comprising screw and nut components;
   (e) rotor shaft means receiving said nut component;
   (f) connecting means connecting said nut component to said rotor shaft means in rotationally fixed, translationally free relationship therewith;
   (g) second delatchable coupling means preventing translational motion of said ball nut means within said rotor shaft;
   (h) first and second reversable drive means for causing rotation of said rotor shaft, said first drive means being adapted to rotate said rotor means in a clockwise direction in normal operation and said second drive means being adapted to rotate said rotor shaft in a counter-clockwise direction in normal operation;
   (i) means for delatching said second delatchable coupling means when either of said motors are operated in the reverse direction from normal operation; and
   (j) means directing said ball nut into delatching engagement with said first delatching means after said second delatching means is delatched.

2. A fail-safe actuator comprising:
   (a) an output shaft for connecting said actuator to a load;
   (b) a guide shaft receiving said output shaft in sliding relationship therewith;
   (c) first delatchable coupling means connecting said output shaft to said guide shaft;
   (d) reversible drive means in longitudinal driving relationship to said guide shaft for extending and retracting said drive shaft;
   (e) second delatchable coupling means for disengaging said drive means from said drive shaft;
   (f) means for delatching said first delatchable coupling means; and
   (g) means for delatching said second delatchable coupling means.

* * * * *